United States Patent [11] 3,552,599

[72] Inventor Harry L. Redding
 Pontiac, Mich.
[21] Appl. No. 759,302
[22] Filed Sept. 12, 1968
[45] Patented Jan. 5, 1971
[73] Assignee General Motors Corporation
 Detroit, Mich.
 a corporation of Delaware

[54] BLOW MOLDED FUEL TANK
 2 Claims, 5 Drawing Figs.
[52] U.S. Cl. .................................................... 220/72,
 150/0.5
[51] Int. Cl. ..................................................... B65d 11/22
[50] Field of Search.......................................... 220/72
 (Plastic Molded), 86; 229/2.5; 150/.5; 215/1.5

[56] References Cited
 UNITED STATES PATENTS
3,160,306 1/1964 Smalley........................ 220/9(F)
3,330,439 7/1967 Moorman...................... 220/72X FOREIGN PATENTS
273,402 10/1964 Australia...................... 220/20

Primary Examiner—George E. Lowrance
Attorneys—John C. Evans and Warren E. Finken ABSTRACT: In preferred form, a plastic automobile fuel tank with truncated conical projections formed within two opposite sides of the fuel tank and extending into the fuel tank interior, the adjoining truncated ends of two oppositely directed projections being fused together to impart rigidity to the fuel tank by the formation of hourglass-shaped columns through the fuel tank interior and being provided with a notch to initiate a parting path between the fused projections allowing the fuel tank to expand without rupturing if excessive internal pressure occurs. The aforementioned columns in cooperation with the sides of the fuel tank serve to reinforce the tank against internal and external forces that would undesirable distort the tank.

PATENTED JAN 5 1971

INVENTOR.
Harry L. Redding
BY
J.C. Evans
ATTORNEY

INVENTOR
Harry L. Redding
BY
J.C. Evans
ATTORNEY

BLOW MOLDED FUEL TANK

DISCLOSURE

This invention relates to automobile fuel tanks and, more particularly, to tanks formed of high strength, impact resistant plastic material having a configuration to resist structural deformation.

Fuel tanks desirably are capable of withstanding pressure cycling and high impact loading while being sufficiently flexible to yieldingly deform if necessary. If tank deformation occurs, high stresses may be imparted to parts of the distorted fuel tank. Thus, the juncture of the interconnected segments of such tanks must withstand such stresses and yet the tank must be of relatively light weight and have a configuration that retains a desirable ratio of fuel capacity volume to total tank volume.

Moreover, fuel surge within a tank can be caused by changes in direction and speed of the associated vehicle. Prior art fuel tanks contain internal dividers or baffles to divide the fuel tank into a number of interconnected regions which localize and isolate movement of fuel within the tank. Such elements complicate the manufacture of such tanks.

An object of the subject invention is to provide an automobile fuel tank including truncated projections in opposing sides of the fuel tank wherein pairs of adjoining projections have their truncated ends joined within the fuel tank interior to form connections between the opposing sides of the tank which serve to control sidewall deformation and reinforce the tank against undesirable stress conditions.

A further object of the subject invention is to provide a light weight, unitary fuel tank having all of its parts integrally blow molded from a plastic material and wherein the parts include truncated projections within opposing tank sides with abutting truncated ends integrally joined within the tank to form hollow columns through the fuel tank interior which strengthens opposing walls and prevents fuel sloshing within the fuel tank interior.

An additional object of the subject invention is to provide an annular notch extending about the joint between the projections which may initiate and direct a parting path between the joined projections whenever a predetermined internal pressure is exceeded. This invention thus provides one way in which the fuel tank may expand, if necessary, without rupturing.

Further objects and advantages of the present invention will be apparent from the following description, reference being had to accompanying drawings wherein a preferred embodiment of the present invention is clearly shown.

IN THE DRAWINGS

Figure 1:
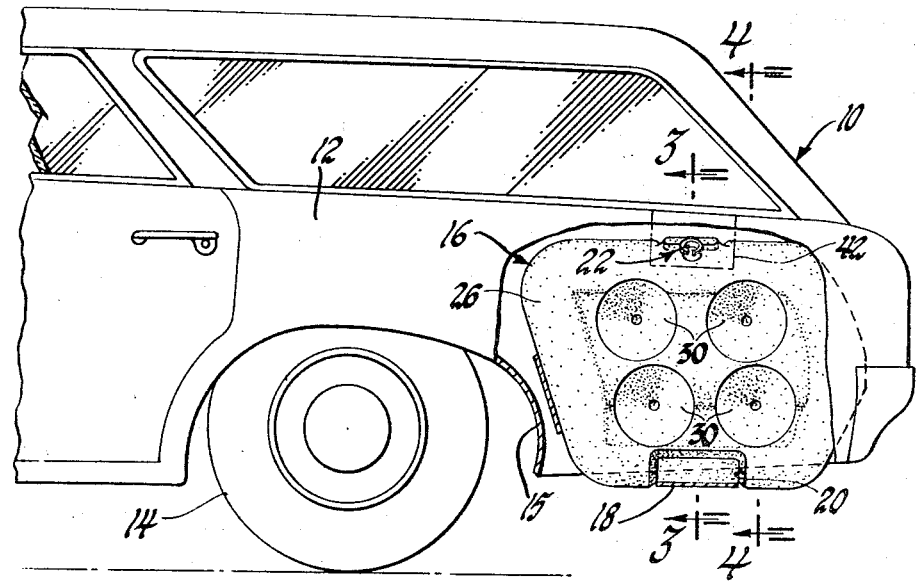
FIG. 1 is a side elevational view showing the left rear quarter of a station wagon partially broken away to show a fuel tank configured in accordance with the present invention.
Figure 2:
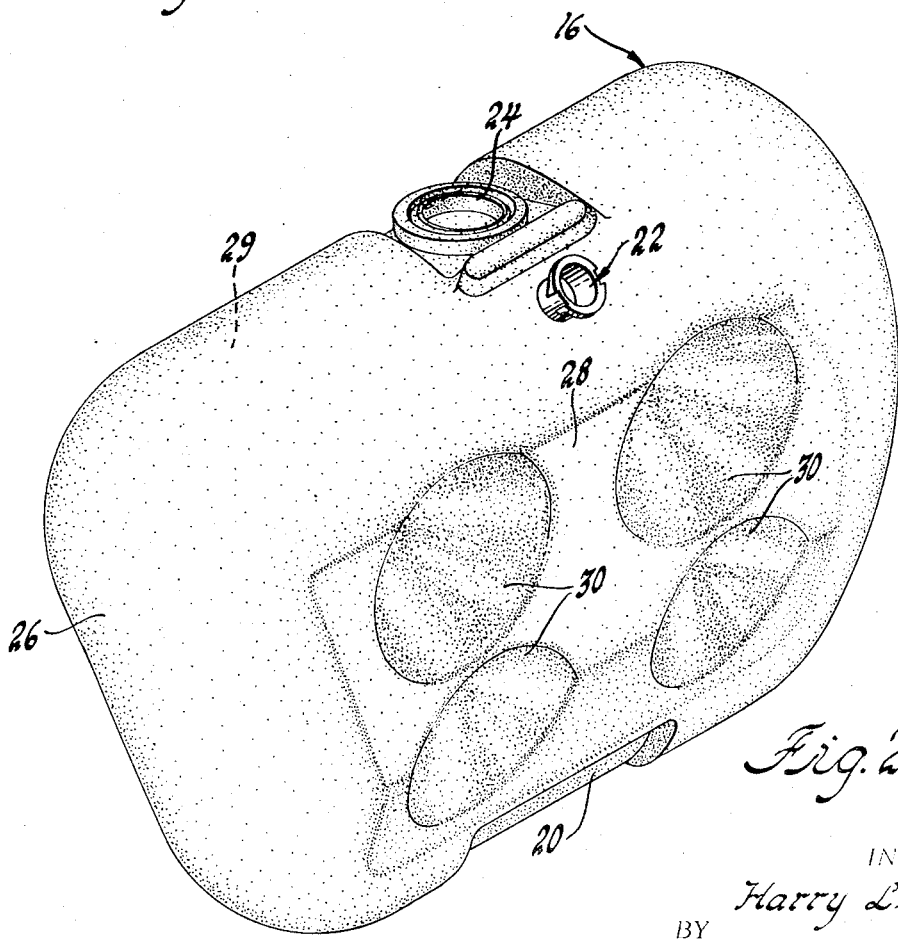
FIG. 2 is a perspective drawing of the subject fuel tank showing inwardly directed projections therein.

In FIG. 1 of the drawings, a partial view of a motor vehicle 10 is illustrated including a body portion 12 and one of the two rear load supporting wheels 14. Located within body portion 12 immediately in back of a well 15 in which wheel 14 is located is a fuel tank 16. It is supported within body portion 12 by a strap 18 which is attached at its ends to the motor vehicle 10 and extends across the bottom of the fuel tank 16. An indented portion 20 is formed within the bottom surface of fuel tank 16 to accommodate the underlying support strap 18.

The fuel tank 16 has a filler fitting 22 connected thereto at an opening 23 formed in the outer side of the upper surface of tank 16 to permit the passage of liquid fuel therein. The fuel tank 16 also includes a second upper opening 24 through which a fuel level indicating and supply system (not shown) is located interiorly of the tank 16.

In accordance with certain principles of the invention, the preferred embodiment of the fuel tank 16 is blow molded as an integrally formed unitary structure having a continuously formed outer wall 26 which includes two opposed sides 28, 29. A plurality of inwardly directed conical projections 30 are formed within each of the sides 28, 29.

Figure 3:
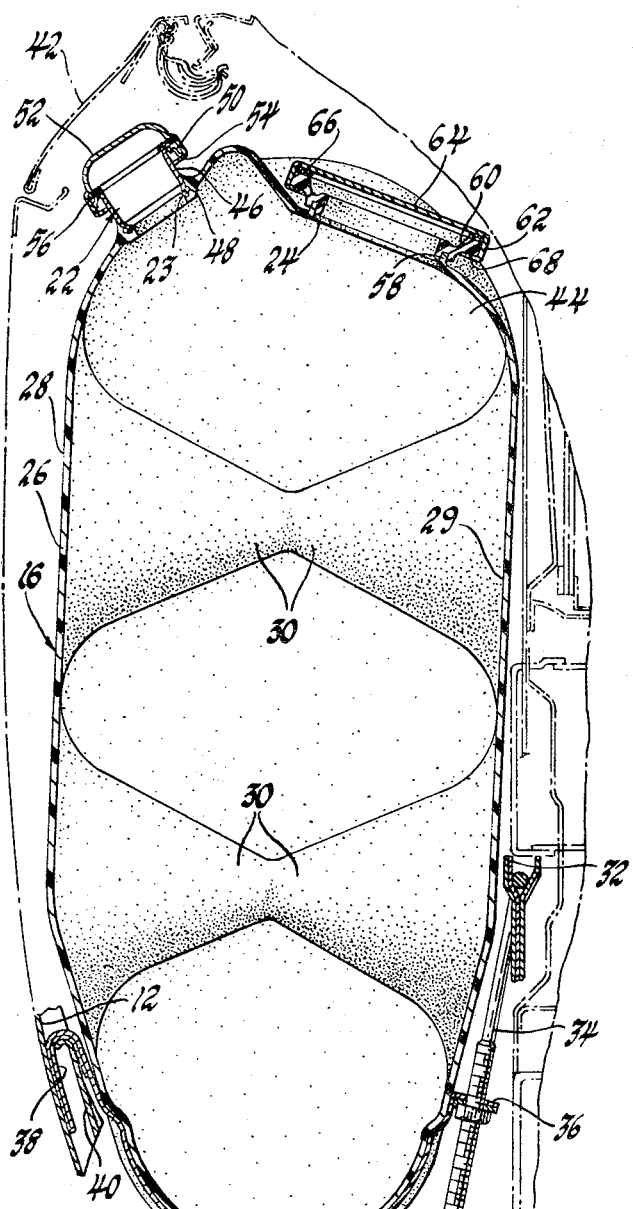
FIG. 3 is an enlarged view in vertical section taken along the section line 3-3 in FIG. 1 looking in the direction of the arrows.

In FIG. 3 of the drawings, the fuel tank 16 is shown more particularly as supported by strap 18 between body portion 12 and an inner wheel house panel 32. A bolt and nut fastener 34 extends from the inner wheel house panel 32 to a flange portion 36 of support strap 18 to support one side of the tank 16. The other end of support strap 18 is formed into hooked flange 38 which supportingly engages a bracket 40 attached to body 12. A hinged filler door 42 is rotatively attached to body portion 12 to provide a closable access opening therethrough to the filler fitting 22 on tank 16.

The fuel tank outer wall 26 encloses an interior space 44 into which liquid fuel can be transferred and stored. The wall 26 of the fuel tank 16 and other integrally blow molded parts, in one preferred working embodiment, are made of impact resistant, nonpermeable high density polyethylene plastic material, having a density as determined by the ASTM D1505 test method of approximately .953 and a flexural modulus as determined by the ASTM D790 test method of 100,000 p.s.i. minimum. The melt index of the plastic material utilized in the subject embodiment has a rating of between .1 and .3 as determined by the ASTM D1238 test method. The thickness of wall 26 in the subject embodiment is approximately .10 inches.

The filler fitting 22 through which liquid fuel enters the interior space 44 includes a cylindrical filler tube 46 which extends at one end through the opening 23 in wall 26 and is sealed therein by a resilient ring 48 surroundingly engaging the outer surface of filler tube 46. The other end of filler tube 46 is turned radially outward and axially downward to form a camming flange 50. The filler tube 46 is closed to atmosphere by a cup-shaped cover 52 whose radially inwardly turned edges 54 engage the flange 50 to axially hold an annular gasket 56 in cover 52 against the end of filler tube 46.

The feedline opening 24 which extends through the upper surface of wall 26 includes an outwardly directed annular ridge 58 formed by the edge of the opening 24. Supported on and secured to ridge 58 is an annular flange 60 which includes radially outwardly directed cam surfaces 62 thereon. A cup-shaped cover 64 is compressibly held against a gasket 66 and flange 60 by a radially inturned edge portion 68 of cover 64.

In tanks having sidewalls with a substantial planar extent and a limited thickness, substantial deformation can occur. Where the tanks are filled with incompressible liquid fuel such deformation can undesirably stress the tank walls. One feature of the integrally formed tank of the present invention is that it has improved means including projections 30 for strengthening the tank under such conditions.

Figure 4:
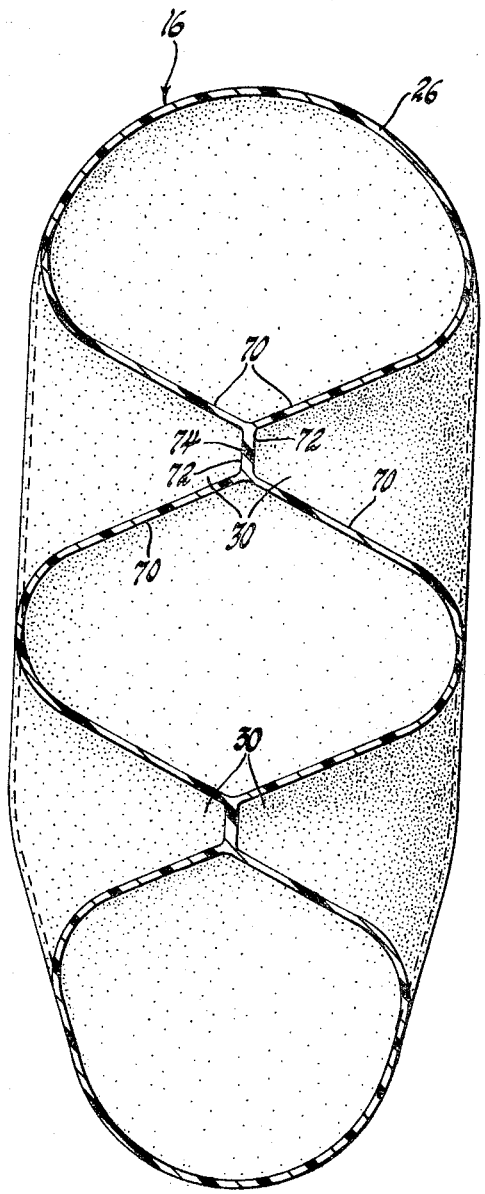
FIG. 4 is an enlarged view in vertical section taken along the section line 4-4 in FIG. 1 looking in the direction of the arrows.

In FIG. 3 and FIG. 4 the inwardly directed conical projections 30 formed in sides 28, 29 of fuel tank 16 are more clearly illustrated. The conical projections 30 include inwardly sloping sides 70 which extend from the fuel tank sides 28, 29 toward the center of interior space 44 ending therein with truncated ends 72. Projections 30 are formed in opposing sidewalls 28, 29 in matched pairs of oppositely directed inwardly pointing truncated projections so as to form hourglass contoured hollow columns through the interior space 44. These hollow hourglass contoured columns consist of two axially aligned inwardly directed truncated projections formed within opposing sidewalls 28, 29. The truncated ends 72 of matched projections 30 are fused one to another during blow molding to impart rigidity to the opposing sidewalls 28, 29 of the fuel tank 16. The fused connection between truncated ends 72 of matched projections 30 creates a connecting wall 74 which extends normal to the axis of the matched projections 30. These columns secure sidewalls 28, 29 together and resist stresses produced by liquid fuel within tank 16 acting on the walls during pressure cycling or tank deformation.

Although the preferred embodiment of the present invention illustrates conical projections whose inwardly protruding sides form an angle with the conical axis of approximately 25°, the above-described configuration is merely illustrative, it being fully understood that other configurations of the inwardly protruding projections are equally well suited for forming interior columns through the fuel tank. For example, cylindrical axially aligned projections could be used although their manufacture would be considerably more difficult. Also, instead of a pair of oppositely directed inwardly protruding projections, a single inwardly directed projection formed in one of the tank sides and fused to the opposing side is feasible. Also, weight considerations aside, it is not necessary that the projections be hollow.

As previously indicated, the preferred embodiment illustrated in the present application is blow molded from a high density polyethylene plastic having a wall thickness of approximately .10 inches. The fused connection between the truncated ends of inwardly directed projections 30 is approximately two times the wall thickness or .20 inches. The diameter of the fused contact between truncated ends is approximately 1 inch. The tank fuel volume approximately equals 23.5 gallons and the total volume bounded by wall 24 is approximately 24.5 gallons including the volume occupied by projections 30.

Figure 5:
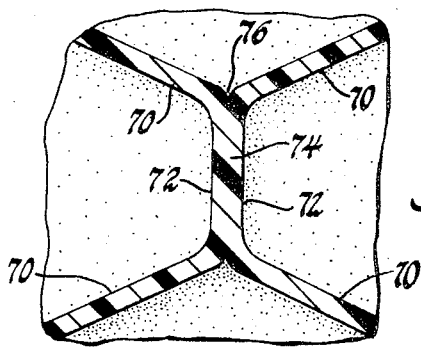
FIG. 5 is a fragmentary vertical sectional view showing a fused connection between a pair of oppositely directed projections with an annular notch formed therearound.

As illustrated in FIG. 5, an annular notch 76 is formed around the connecting wall 74. The notch 76 initiates and directs a parting path between the fused truncated ends 72 whenever a predetermined maximum internal pressure within interior space 44 is exceeded. Because polyethylene is responsive to stress concentrations caused by notch formation, it is possible to separate matched projections along the original fusion path without piercing the ends 72. The purpose of the notched fusion between truncated ends of matched projections illustrated in FIG. 5 is to control the outward movement of opposing sides of a fuel tank caused by buildup of internal pressurization. Thus, whenever a predetermined maximum internal pressure is exceeded, the opposing sides move away from each other so that the fuel tank can assume a maximum volume somewhat spherical configuration. The maximum internal pressurization at which point the fused connection separates is dependent upon the form of the molded notch and the fused contact area between matched projections. By varying these design characteristics, the parting of matched projections can be made to occur over a relatively large range of internal pressure values.

While the embodiment of the present invention as herein described constitutes a preferred form, it is to be understood that other forms might be adapted.

I claim:

1. A fuel tank, comprising, a unitary body portion blow molded of plastic material having substantially parallel opposed sides integrally formed together to define an interior space, inlet means through said body portion for the introduction of fuel into said interior space, outlet means through said body portion for the removal of fuel from said interior space, a plurality of inwardly protruding hollow truncated conical projections formed in each of said opposed sides, each of said truncated projections including an end portion located in said interior space, said projections being positioned in said opposed sides to form matched pairs of axially aligned oppositely pointed projections, each of said matched pairs of projections having ends in juxtaposition intermediate of the opposed sides, Said juxtaposed ends being integrally joined to laterally connect said opposed sides, said joined ends having an annular notch formed therearound to initiate parting of the joined ends if predetermined internal pressurization of the tank is exceeded.

2. A vehicle fuel tank, comprising, a unitary body portion of blow molded plastic material having a pair of vertical substantially parallel opposed sides integrally formed together to define an interior space, inlet and outlet means formed in said body portion for the introduction of fuel into said interior space and for the removal of fuel from said interior space, four horizontally inwardly protruding hollow truncated conical projections formed in each of the opposed sides, each of said hollow projections including an end portion located in said interior space, said projections being positioned in said opposed sides to form pairs of axially aligned projections whose ends adjoin within said interior space, said adjoining ends being fused one to another to provide lateral support for said opposed sides against deformation thereof and having an annular notch formed therearound to initiate parting of the joined ends and permit expansion of the tank if predetermined internal pressurization of the tank is exceeded.